J. O'LEARY.
CAR FENDER.
APPLICATION FILED NOV. 9, 1908.
939,952.
Patented Nov. 9, 1909.
2 SHEETS—SHEET 1.
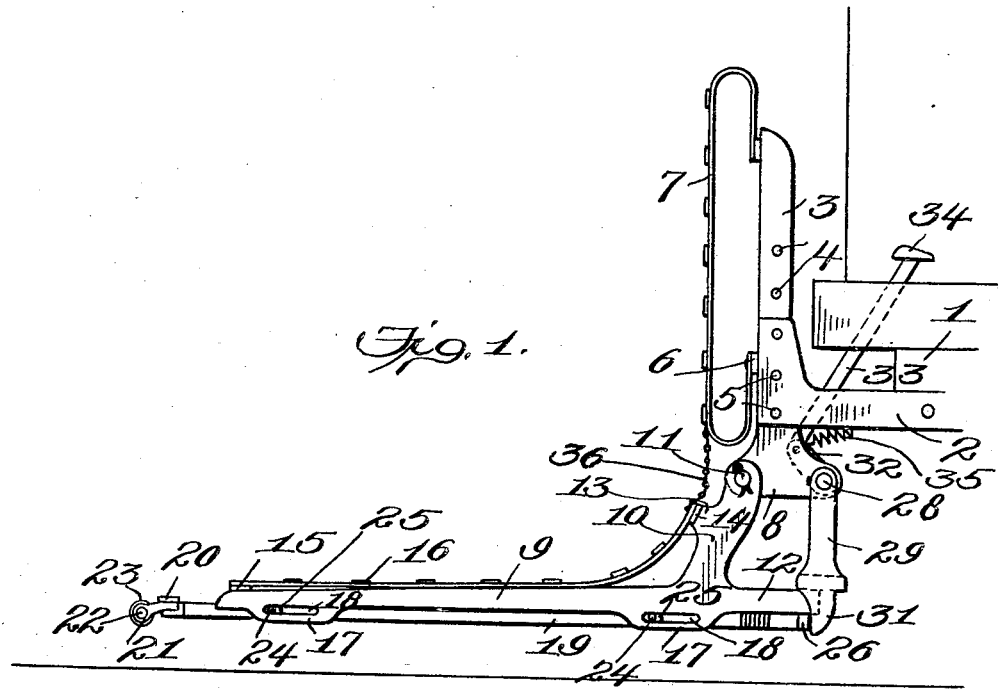
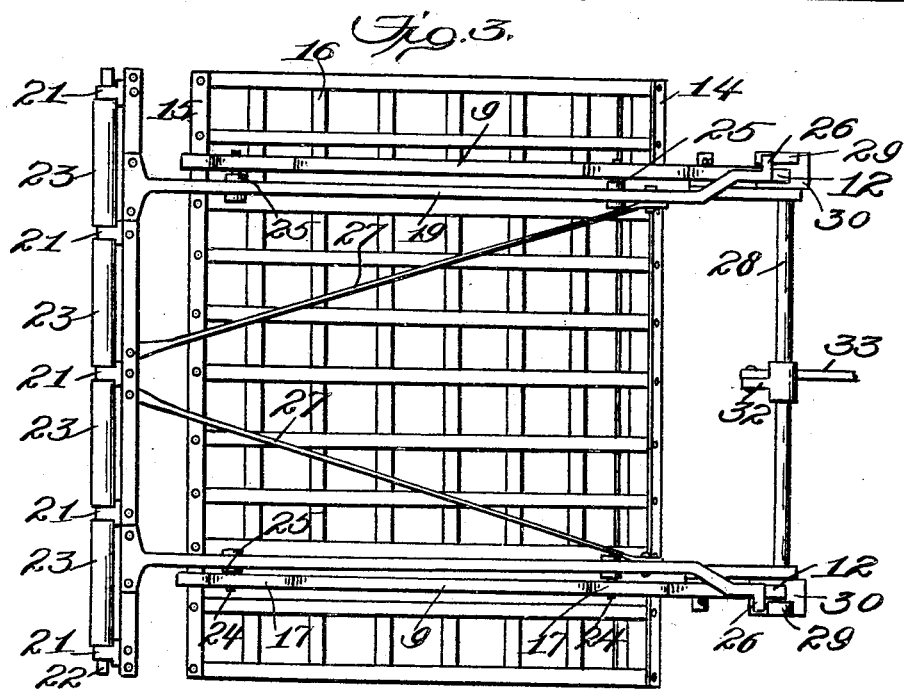
Witnesses:
C. D. Kesler
Inventor
John O'Leary
By
James L. Norris
Atty.

J. O'LEARY.
CAR FENDER.
APPLICATION FILED NOV. 9, 1908.
939,952.
Patented Nov. 9, 1909.
2 SHEETS—SHEET 2.
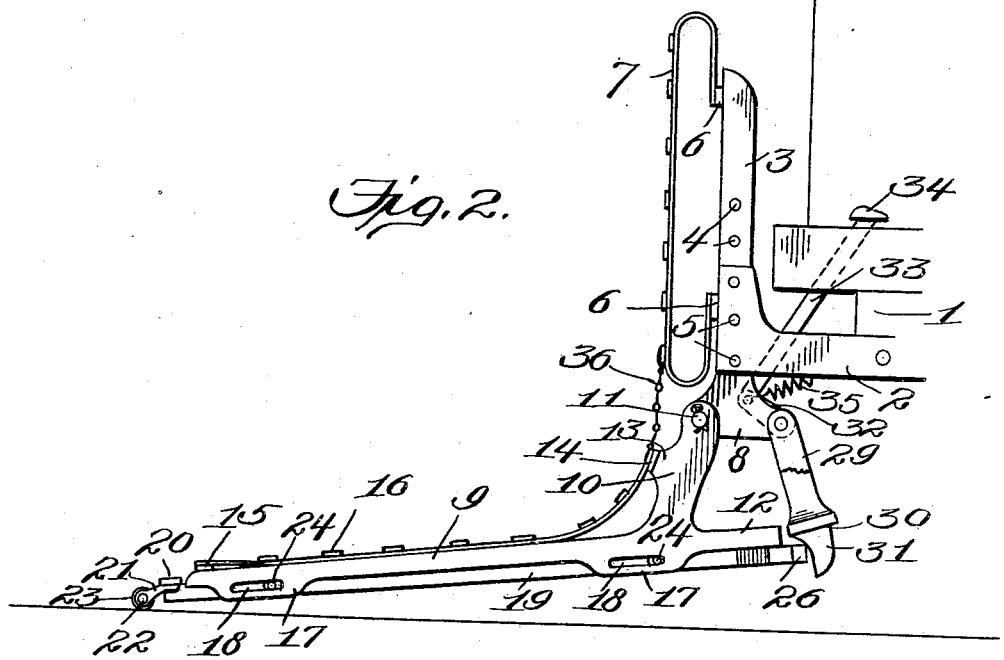
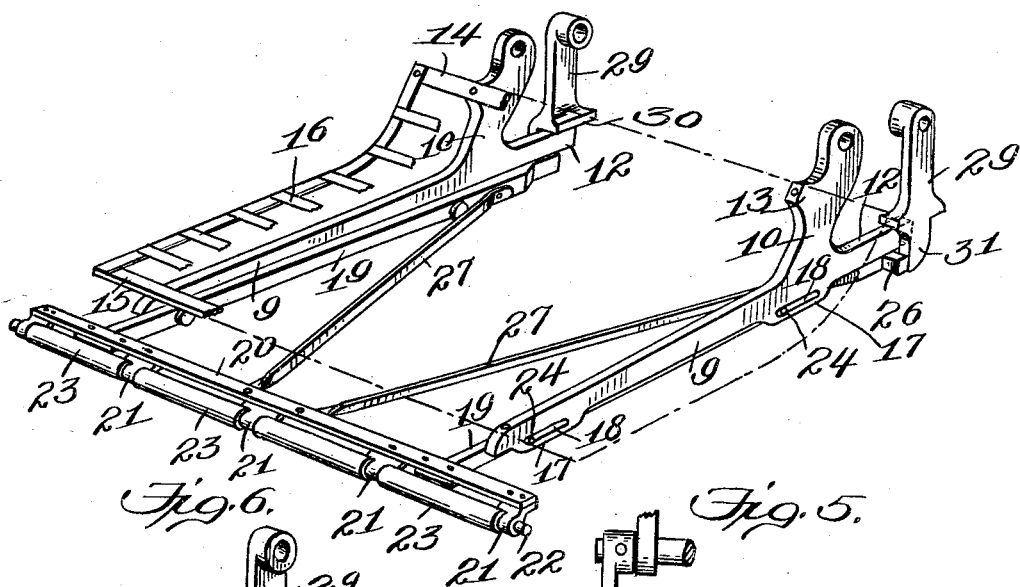
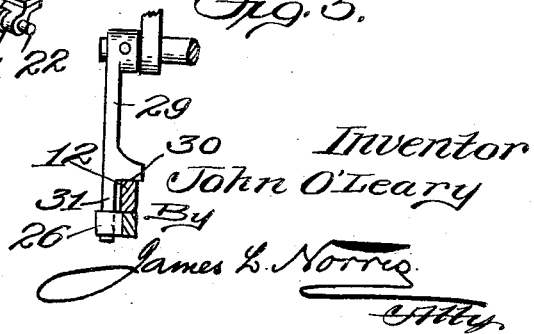
Witnesses
Inventor
John O'Leary
By
James L. Norris
Atty.

UNITED STATES PATENT OFFICE.

JOHN O'LEARY, OF COHOES, NEW YORK, ASSIGNOR OF ONE-FOURTH TO GEORGE H. McDOWELL, OF COHOES, NEW YORK.

CAR-FENDER.

939,952.  Specification of Letters Patent.  Patented Nov. 9, 1909.

Application filed November 9, 1908. Serial No. 461,729.

*To all whom it may concern:*

Be it known that I, JOHN O'LEARY, a citizen of the United States, residing at Cohoes, in the county of Albany and State of New York, have invented new and useful Improvements in Car-Fenders, of which the following is a specification.

This invention relates to car fenders, and the object of the invention is to provide an effective device of this character which is normally held elevated clear of the track rails or at such height that it will readily pass over ordinary track bed projections during travel of the car to which it is attached, but that may be instantly released and lowered when striking abnormal objects in the path of travel of the car and cause such objects to be thrown over into the fender without injury to the latter or the object. The fender is also under manual control of the motorman or driver and may be released from the car platform. In view of the dual operation of the fender material advantages result in maintaining a clear track and in preventing human objects from passing under the fender and being injured by the car on which the fender is used. The improved fender is also adapted to be applied to any car now in use, as it does not require material change or modification of the car structure to operatively apply the fender thereto.

The fender involves other objects and advantages which, with the foregoing, will be set forth at length in the following description and the novelty specified in the appended claims.

For convenience of illustration and to indicate the many advantages of the invention one simple adaptation of the fender is shown by the accompanying drawings and will be completely disclosed in the description; the invention is not limited, however, to this precise structure, as certain variations may be adopted within the scope of the claims.

In the drawings: Figure 1 is a side elevation of a portion of a car end showing the improved fender applied thereto and illustrated in normal position. Fig. 2 is a similar view showing the fender as having been tripped and in lowered position. Fig. 3 is a bottom plan view of the fender. Fig. 4 is a perspective view of the fender partially broken away. Fig. 5 is a detail sectional elevation of a portion of the fender showing the position of one of the dogs when in locking position. Fig. 6 is a detail perspective view of one of the locking dogs.

The improved fender structure may be supported in any desirable manner and is shown applied to a car end and secured to sills 1, the frame structure of the fender comprising a supporting means consisting of arms 2, one on each side, having uprights 3 secured to their front extremities, the uprights being adjustable vertically with relation to the arms 2 through the medium of a plurality of bolt openings 4 provided in excess of the number required to receive the bolts or fastening means 5 engaging the front extremities of the arms 2 and the said uprights. This adjustable application of the uprights 3 permits the fender structure as an entirety to be raised and lowered in accordance with the height of the car bed above the track rails and also in accordance with the height it is desired to dispose the fender above the track rails. Extending transversely across the uprights 3 are cross bars or supports 6 which may be of any suitable length or project outwardly beyond the uprights, and attached thereto is a vertical spring bed or cushion 7 which acts as a rear buffer for the fender against which an object thrown into the fender may impact without shock or jar or injury, if the object so thrown be a human being.

The lower extremities of the uprights 3 depend below the lower edges of the arms 2 and are increased in width as at 8 to provide bearings and supports for parts which will be presently explained. The lower extremities of these uprights 3 form hangers for supporting the movable or main portion of the fender. This main portion of the fender comprises a pair of arms 9 having upwardly projecting extensions 10 which are terminally secured against the outer side of the lower extremities of the uprights 3 by suitable bolts 11. The arms 9 also have contact projections 12, one on each, and which extend rearwardly beyond the points of attachment of the said arms through the medium of the extensions 10. The extensions 10 serve as suspending means for the arms 9 and the major portion of the fender, as will presently appear, and these extensions have front bosses or lugs 13 to which a cross strip or bar 14 is terminally attached, and on the front extremities of the arms a cross bar 15 is also secured, said cross bars 14 and 15 tying the two arms together and also serving as a holding means and part of a spring bed 16 made up of longitudinal and cross resilient strips of metal and on which the object picked up by the fender falls with obvious advantages. Each of the arms has a lower depending enlargement 17 at the front extremity and also at a point adjacent to the extension or suspending means 10, the depending enlargements each having a longitudinal slot 18, serving as guides for operatively supporting a slidable frame. This slidable frame may be termed a trip frame or means for automatically releasing the fender from a normally elevated position to permit a drop of the fender in close relation to the track rails. This slidable or trip frame comprises side bars 19 connected at their front ends by a transversely extending nose or striker bar 20 from which projects a plurality of bearings 21 having a rod or shaft 22 mounted therein and carrying a plurality of yielding rollers 23 which stand in advance of the bar 20. The side bars 19 each have a pair of studs or pins 24 projecting outwardly therefrom into the slots 18 of the enlargements 17, space collars 25 being mounted on the said studs or pins between the side bars 19 and 9 to maintain the said slide frame in practical working position with relation to the carrying frame or main frame of the fender comprising the bars 9. The rear ends of the side bars 19 are deflected outwardly and terminate in angular feet or pushing projections 26, one on each side bar, the rear outwardly deflected terminals of the said side bars 19 moving under the rear extremities of the side bars 9 or the contact projections 12 of the latter. Between the side bars 19 and the transversely extending nose or striker bar 20, braces 27 are interposed and terminally secured as shown by Fig. 4 so as to brace the central portion of the nose or striker bar and prevent warping or twisting of the latter.

Mounted in the rear portions of the lower extremities or hangers 8 of the uprights 3 is a rock-shaft 28 which projects outwardly beyond the said hangers and has the upper terminals of locking devices or dogs 29 fixed thereon to move regularly therewith. The locking devices or dogs 29 have inwardly projecting offsets or shoulders 30 to engage and bear on the contact projections 12, and said locking devices or dogs are also provided with depending striker extremities 31 which normally extend over the outer sides of the contact projections 12 in line with and for engagement by the feet 26 at the rear ends of the bars 19. The shaft 28 has a crank arm 32 secured thereto and attached to the free extremity of the latter is a trip bar 33 which extends upwardly through the car platform and has its upper end provided with a foot-engaging head 34. A retractile spring 35 is also secured to the crank arm 32 and to an adjacent portion of the car end, said spring operating to restore the shaft 28 and the locking devices or dogs 29 to normal position, the release of the dogs from the contact projections 12 being made in opposition to the resistance of the spring 35. The normal engagement of the locking devices or dogs 29 with the contact projections 12 is positive and maintained during travel of the car and fender by the spring 35 so that accidental disengagement of the locking devices or dogs from the projections 12 will be prevented.

From the foregoing the operation will be readily understood. The fender when in normal position is elevated to a horizontal plane, as shown by Fig. 1, and the lower shouldered extremities of the locking devices or dogs 29 ride over and bear upon the upper edges of the contact projections 12 with the striking terminals 31 extending downwardly over the outer side of the said projections in alinement with the feet 26 of the bars 19 comprised in the construction of the slidable or releasing frame. This slidable or releasing frame is normally pushed forwardly, as shown by Figs. 1, 3 and 4, with the studs or pins 24 adjacent the front terminals of the slots 18. When the nose or striker bar and the yielding rollers 23 come forcefully into contact with any object or a human being, the slidable or releasing frame is forced backwardly and the locking devices or dogs 29 are thrown rearwardly out of engagement with the contact projections 12 and instantly the fender carrying the slidable or releasing frame will fall and assume an angle of inclination as shown by Fig. 2, and the object struck will be thrown over onto the spring bed 16 and against the spring buffer held by the uprights 3. After the object caught is released from the fender the parts of the latter may be reset and locked in normal position as shown by Fig. 1. At any time desired the motorman or driver may depress the bar 33 and release the fender by throwing the locking devices or dogs 29 out of engagement with relation to the contact projections 12 and the same dropping action of the fender will ensue, which dropping operation takes place in view of the preponderance of weight in advance of the fulcrum means for the fender. The drop of the fender may be limited by the use of suspending chains 36 connected to the cross bar 14 and the lower portion of the buffer 7; and it is obvious that by connecting the chains 36 to the buffer 7 the fender when dropped will be resiliently cushioned.

The improved fender will be found exceptionally advantageous in use and as the parts are comparatively simple and few in number as well as strong and durable they will not become readily broken or injured and the entire fender organization may be applied to cars at a reduced cost.

What is claimed is:

1. In a fender, the combination of a main portion comprising a pair of arms having upwardly projecting extensions, means to which said extensions are movably attached, the arms having contact projections in rear of the extensions, a bed carried by said arms, a slidable frame engaging the arms and having a striking means at its front extremity normally projected beyond the said arms, and locking dogs to engage the rear projections of the arms and released from the latter by the rear terminals of the slidable frame.

2. In a fender, the combination with a car end, of vertically adjustable means carried thereby, a main fender portion having side arms provided with extensions pivotally connected to said means, the said arms also having rear contact projections, a bed disposed on the arms, a slidable frame held by the arms and having a front striker bar, and locking devices also movably attached to the said vertically adjustable means to engage the rear contact projections of the arms, the locking devices being released from the contact projections by the rear terminals of the slidable frame.

3. In a fender, the combination of a movably suspended main frame having slots in the opposite side portions thereof, a releasing frame slidably mounted in the main frame and provided with oppositely extending studs engaging the said slots, and locking devices having portions to engage the main frame and for contact with portions of the releasing frame.

4. In a fender, the combination with a car end, of supporting arms connected thereto, uprights adjustably connected to the front extremities of said arms, a spring buffer supported by said uprights, a main frame movably suspended from the lower extremities of the uprights, a releasing frame slidably mounted in the main frame and provided with a striker means at its front extremity, locking devices also movably connected to the lower extremities of the uprights to engage the rear extremities of the main frame, the locking devices being disengaged from the rear extremities of the main frame by the releasing frame, and a spring bed mounted on the said main frame.

In testimony whereof I have hereunto set my hand in presence of two subscribing witnesses.

JOHN O'LEARY.

Witnesses:
  WILFRED PALIN,
  ARCADE AUDET.